US008867091B2

(12) United States Patent
Matsushita

(10) Patent No.: US 8,867,091 B2
(45) Date of Patent: Oct. 21, 2014

(54) IMAGE PROCESSING SYSTEM, IMAGE PROCESSING APPARATUS, IMAGE SCANNING APPARATUS, AND CONTROL METHOD AND PROGRAM FOR IMAGE PROCESSING SYSTEM

(75) Inventor: Takeshi Matsushita, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1353 days.

(21) Appl. No.: 11/733,109

(22) Filed: Apr. 9, 2007

(65) Prior Publication Data

US 2007/0242316 A1    Oct. 18, 2007

(30) Foreign Application Priority Data

Apr. 18, 2006    (JP) .................................. 2006-115014

(51) Int. Cl.
*H04N 1/00* (2006.01)
*H04N 1/21* (2006.01)
(52) U.S. Cl.
CPC ......... *H04N 1/2175* (2013.01); *H04N 1/00384* (2013.01); *H04N 1/00241* (2013.01); *H04N 2201/0081* (2013.01); *H04N 1/00236* (2013.01); *H04N 2201/3246* (2013.01)
USPC .............................. 358/1.6; 358/474; 358/1.1
(58) Field of Classification Search
USPC .......................................... 358/1.6, 1.1, 474
See application file for complete search history.

(56) References Cited

U.S. PATENT DOCUMENTS 6,975,434 B1 * 12/2005 Pilu et al. ...................... 358/474
2004/0249871 A1 * 12/2004 Bazoon .......................... 707/206
2005/0168763 A1 * 8/2005 Higuchi et al. .............. 358/1.13
2006/0062615 A1 * 3/2006 Horio .............................. 399/374
2006/0080719 A1 * 4/2006 Minatogawa et al. ........ 725/105

FOREIGN PATENT DOCUMENTS

| JP | 11-065738 A   | 3/1999 |
| JP | 2002-009991 A | 1/2002 |
| JP | 2005-062893 A | 3/2005 |
| JP | 2006-060577 A | 3/2006 |

OTHER PUBLICATIONS

Sugasawa, Eiji. "Organizing Photos with Windows." Nikkei Personal Computing, Nikkei Business Publications, Inc., Japan Apr. 6, 2006: 125-28.
"Our Editorial Staff Answers Your Questions! A Beginners Q&A Session." Nikkei Beginners, Nikkei Business Publications,Inc., Japan Feb. 16, 2006: 114-15.
Cactus. "Clean Windows—Run Faster! XP/2000/Me/98." Windows Start, Mainichi Communications Inc., Japan Oct. 29, 2005: 32, 46.

(Continued)

*Primary Examiner* — Benny Q Tieu
*Assistant Examiner* — Martin Mushambo
(74) *Attorney, Agent, or Firm* — Canon U.S.A., Inc. IP Division

(57) ABSTRACT

To store image data scanned by an image scanning unit in a way that corresponds to each page group, an image processing system scans an original and generates image data, and stores the image data in a storage unit separately from image data previously stored in the storage unit if a scan command is given via a first command input unit, and stores the image data in the storage unit by associating the image data with image data previously stored in the storage unit if a scan command is given via a second command input unit.

23 Claims, 15 Drawing Sheets

(56) References Cited

OTHER PUBLICATIONS

Yamaguchi, Yu. "Problems Every Designer Faces—and How to Solve Them." MdN, MdN Corporation, Japan Oct. 12, 2005: 45, 51.
"Send! Bundle! Find! PDFs Are 100x More Convenient than Paper!" Nikkei PC 21, Nikkei Business Publications,Inc., Japan Feb. 28, 2006: 36-37.
Somehara, Mutsumi. "Leave It to PDFs—Eliminating the Need to Rely Only on Word and Excel." Nikkei Personal Computing, Nikkei Business Publications, Inc., Japan Oct. 6, 2005: 76-77.

* cited by examiner

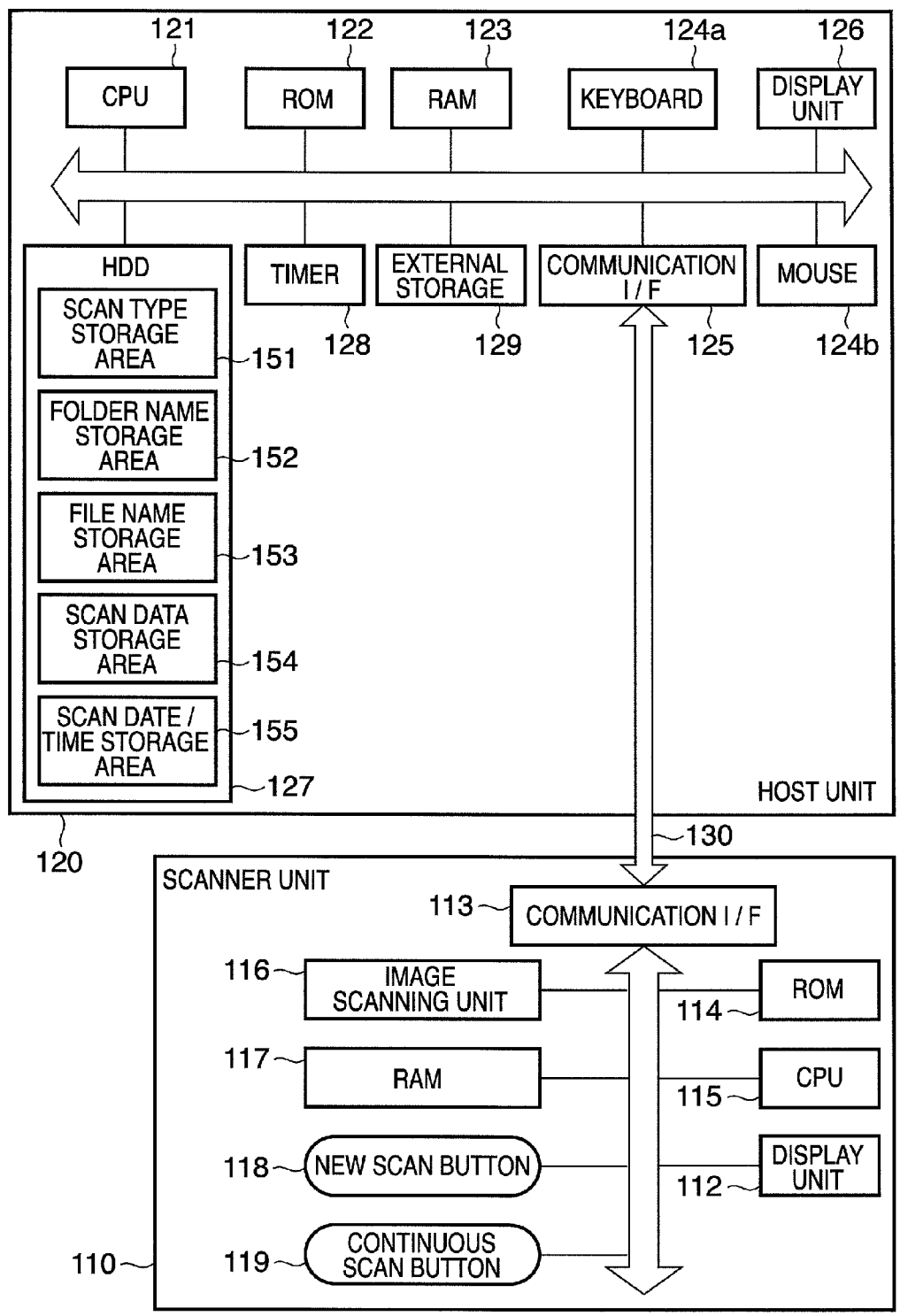

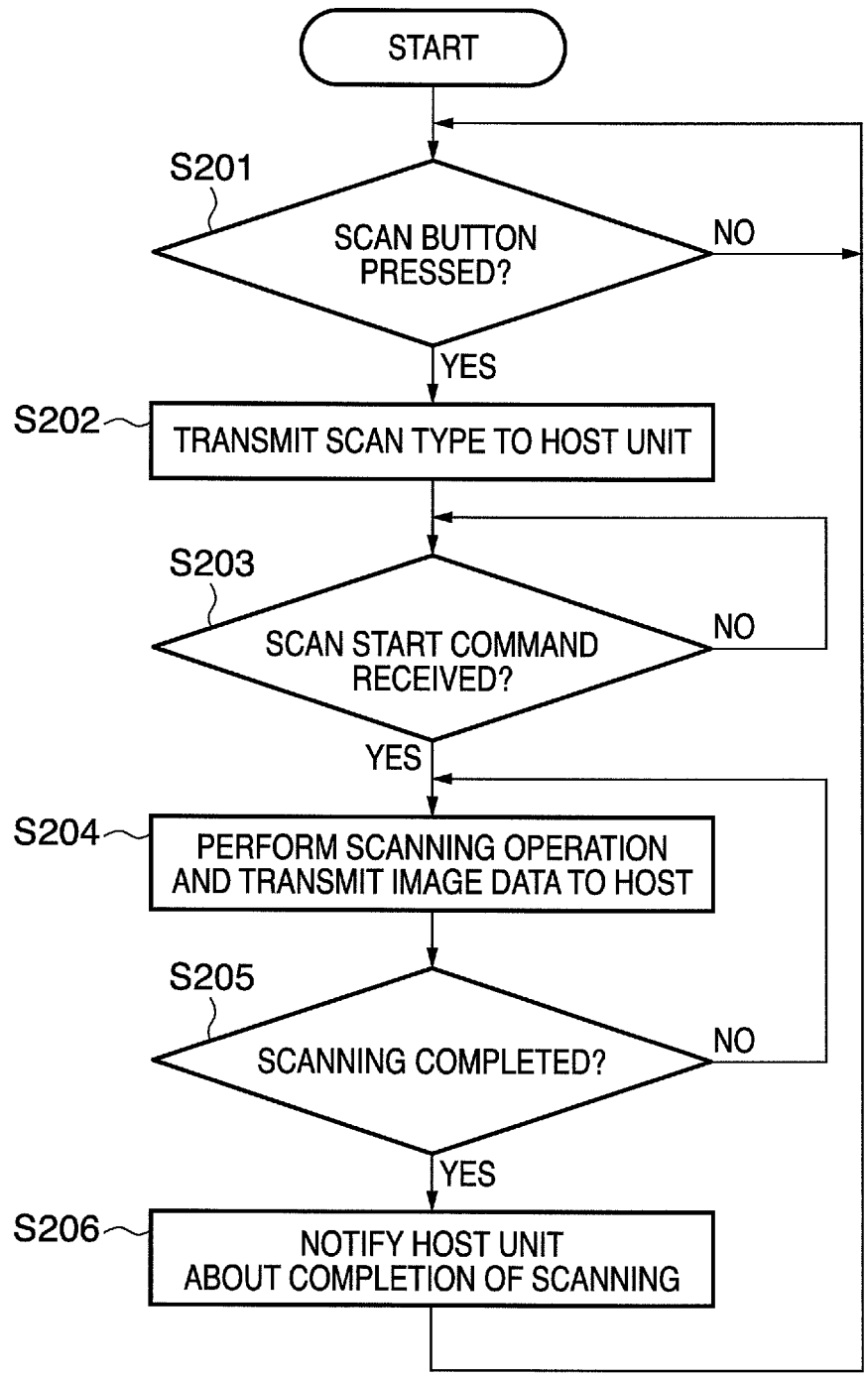

F I G. 4

MORE THAN 24 HOURS HAVE PASSED SINCE THE PREVIOUS SCAN.
DO YOU REALLY WANT TO PERFORM A CONTINUOUS SCAN?

| OK | CANCEL |

F I G. 6B
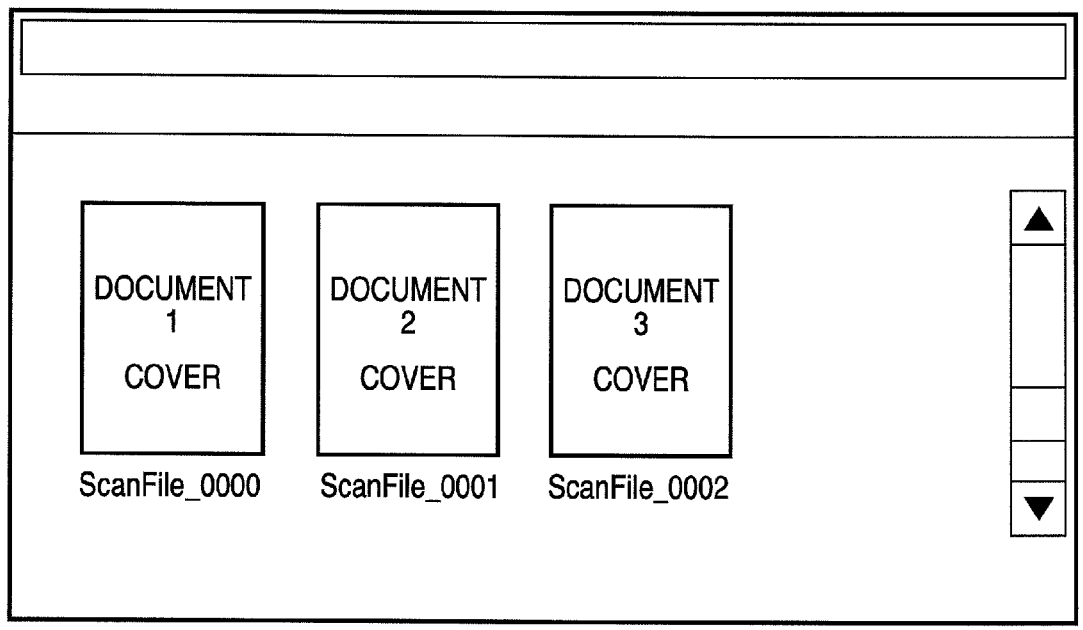

FIG. 10A

DocumentFile_0000.pdf

DocumentFile_0001.pdf

DocumentFile_0002.pdf

ImageIndex.html

IMAGE PROCESSING SYSTEM, IMAGE PROCESSING APPARATUS, IMAGE SCANNING APPARATUS, AND CONTROL METHOD AND PROGRAM FOR IMAGE PROCESSING SYSTEM

BACKGROUND OF THE INVENTION

1. Field of the Invention

The present invention relates to a technique for storing image data scanned by an image scanning apparatus in a storage unit.

2. Description of the Related Art

Conventional scanners (image scanning apparatus) include a push-scan type scanner. With this type, when a Scan button on the scanner is pressed, image data is stored in a storage unit of a host machine installed separately from the scanner. When scanning an original consisting of multiple pages with a scanner of the push-scan type, all scanned image data is generally stored in a specified folder in the storage unit of the host machine. Thus, even if the scanned original consists of multiple groups such as Document 1, Document 2, and Document 3, the image data is stored in a specified folder without distinction.

On the other hand, Japanese Patent Laid-Open No. 11-65738 discloses a technique which allows a user to change the place for saving image data as required by monitoring thumbnails of scanned images on a display unit of a host machine. When a scanned original consists of multiple groups, if the user is allowed to specify where to save each group, it is possible to store image data in a way that corresponds to page groups.

However, the technique described above has a problem in that it is burdensome for the user to classify/distinguish image data produced by scanning an original consisting of multiple groups. That is, with typical image data storage techniques, the user himself/herself must classify image data on a group by group basis by checking the image data after scanning the original. Even with the technique disclosed in Japanese Patent Laid-Open No. 11-65738, the user must alternate between giving a scan command to the scanner and specifying the storage location in the host machine for each page group. This is burdensome for the user.

SUMMARY OF THE INVENTION

An embodiment of the present invention is provided which makes it possible to take image data scanned by an image scanning (scanner) unit and store it in a storage unit in a way that corresponds to each page group, while reducing the burden on the user.

An image processing system according to an embodiment of the present invention is configured as follows.

An image processing system comprising: an image scanning unit which scans an original and generates image data; a first command input unit and a second command input unit which give the image scanning unit a command to scan an original image; a storage unit which stores the image data generated by the image scanning unit; and a control unit which performs control so as to store the image data generated by the image scanning unit in the storage unit separately from image data previously stored in the storage unit if a scan command is given via the first command input unit, and store the image data generated by the image scanning unit in the storage unit by associating the image data with image data previously stored in the storage unit if a scan command is given via the second command input unit.

An image processing apparatus according to an embodiment of the present invention is configured as follows.

An image processing apparatus comprising: an image scanning unit which scans and generates image data; and a control unit which performs control so as to store the image data generated by the image scanning unit in a storage unit separately from image data previously stored in the storage unit if a first scan mode is selected, and store the image data generated by the image scanning unit in the storage unit by associating the image data with image data previously stored in the storage unit if a second scan mode is selected.

A method for an image processing system according to an embodiment of the present invention is configured as follows.

A method comprises: scanning an original with the image scanning unit and generating image data; and performing control so as to store the image data in a storage unit separately from image data previously stored in the storage unit if a scan command is given via a first command input unit, and store the image data in the storage unit by associating the image data with image data previously stored in the storage unit if a scan command is given via a second command input unit.

An image scanning apparatus according to an embodiment of the present invention is configured as follows.

An image scanning apparatus comprises: a scanning unit which scans an original and generates image data; a specifying unit which specifies either a new scan mode or a continuous scan mode; and an output unit which outputs the image data to an external apparatus by associating the image data with the new or continuous scan mode specified by the specifying unit.

An embodiment of the present invention provides a technique which makes it possible to store image data scanned by an image scanning (scanner) unit in a storage unit in a simpler manner that corresponds to each group specified by the user.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an overall configuration of an image processing system according to a first embodiment;

FIG. 2 is an operation flowchart of a scanner unit 110;

FIG. 4 is a diagram showing an example of a confirmation message displayed on a display unit 126;

FIG. 6B is a diagram showing, in an exemplary fashion, a state of image data stored when the series of scanning operations in FIG. 5 is performed;

FIG. 10A is a diagram showing, in an exemplary fashion, a state of image data stored when the series of scanning operations in FIG. 5 is performed;

DESCRIPTION OF THE EMBODIMENTS

Figure 3A:
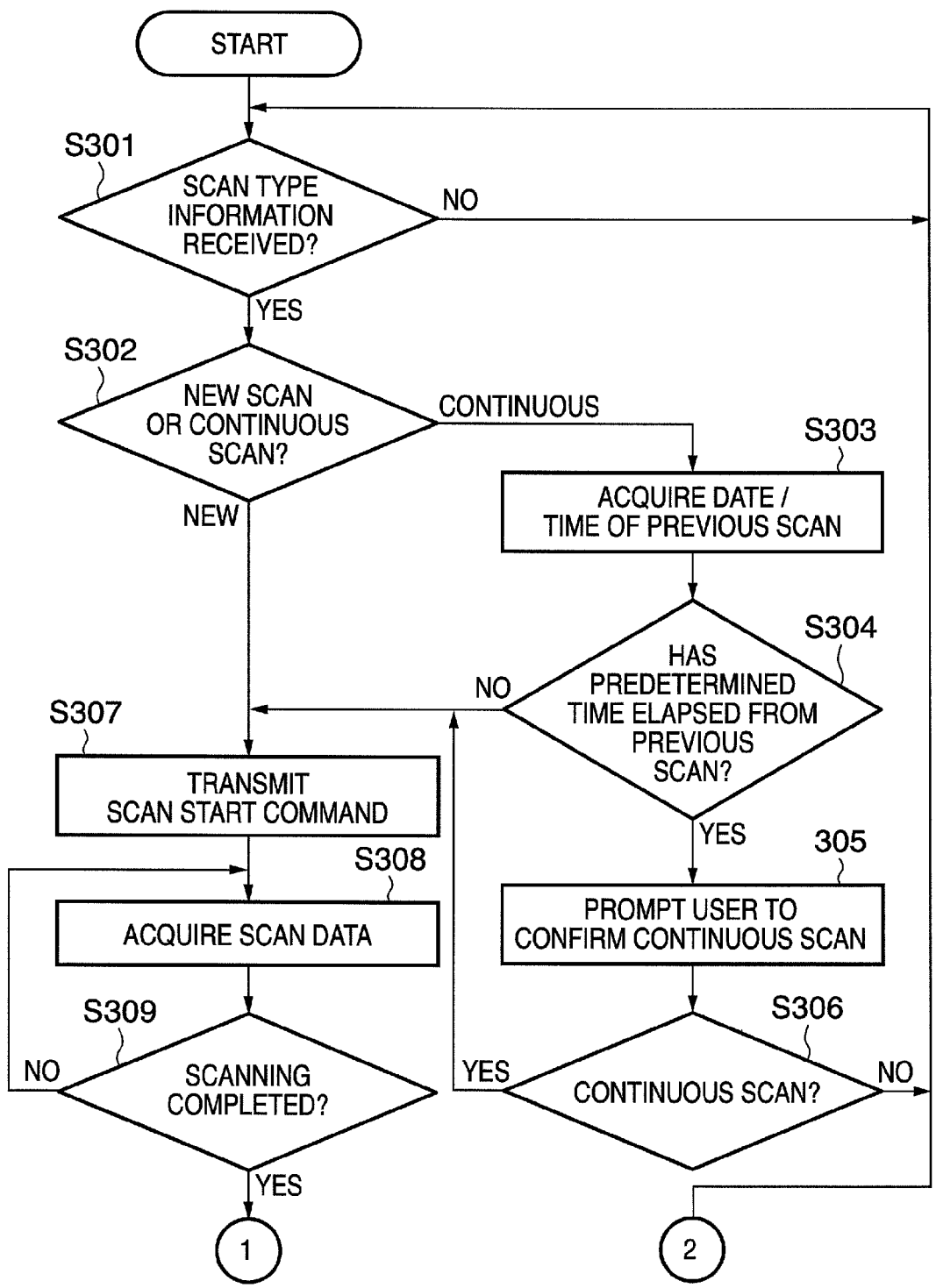
FIG. 3A is an operation flowchart of a host unit 120.

Preferred embodiments of the present invention will be described in detail below in an exemplary fashion with reference to the drawings. However, components of the embodiments are only exemplary, and should not be construed as limiting the scope of the present invention.

(First Embodiment)

A first embodiment of the image processing system according to the present invention will be described below taking as an example of an image processing system including a scanner unit and host unit.

<Equipment Configuration>

FIG. 1 is a block diagram showing an overall configuration of the image processing system according to the first embodiment. As shown in the figure, the image processing system includes a scanner unit 110 which scans an original and generates image data and a host unit 120 which stores the image data generated by the scanner unit 110. Incidentally, the scanner unit 110 and host unit 120 are connected via a communications cable 130 so that they can exchange various digital data.

The scanner unit 110 includes a CPU 115, communication interface (I/F) 113, RAM 117, image scanning unit 116, ROM 114, New Scan button 118, Continuous Scan button 119, and display unit 112, all of which are interconnected via an internal system bus.

The CPU 115 controls various parts by executing various programs stored in the ROM 114. Also, the CPU 115 can execute the various programs stored in the ROM 114 based on various instructions received from the host unit 120 via the communications cable 130. The ROM 114 stores programs and the like executed on startup of the scanner unit 110 and the like. The RAM 117 temporarily stores various programs and various data executed by the CPU 115. The display unit 112 is a functional component which visually displays various information resulting from execution of various programs by the CPU 115 so that the user can view the information.

The image scanning unit 116 is a functional component which optically reads various originals such as documents and photographs and converts them into digital data. It includes a sensor and drive system (not shown). The New Scan button 118 and Continuous Scan button 119 are user interfaces which receives a scan command issued to the image scanning unit 116 from the user. Differences between the New Scan button 118 and Continuous Scan button 119 will be described later with reference to a process flow of the scanner unit 110.

The communication I/F 113 controls communications with external devices such as the host unit 120. The communication I/F 113 may be a USB or other interface used to connect peripheral devices or Ethernet (registered trademark) or other network interface.

The host unit 120 includes a CPU 121, ROM 122, RAM 123, keyboard 124a, mouse 124b, display unit 126, hard disk drive (HDD) 127, timer 128, external storage 129, and communication interface (I/F) 125, all of which are interconnected via an internal system bus.

The CPU 121 controls various parts by executing various programs stored in the ROM 122 or HDD 127. The ROM 122 stores programs and the like executed on startup of the host unit 120 and the like. The RAM 123 temporarily stores various programs executed by the CPU 121 as well as various data. The keyboard 124a and mouse 124b (which is a pointing device) are used in order for the host unit 120 to accept various inputs from the user. The display unit 126 is a functional component which visually displays various information resulting from execution of various programs by the CPU 121 so that the user can view the information. For example, it displays a user interface of scanner software or scanner unit driver software. The timer 128 is a functional component which manages time information (including date and time). The external storage 129 is a removable storage medium such as a CD-ROM, floppy (registered trademark) disk, or flash memory.

The HDD 127 is a large-capacity storage. It temporarily stores various programs and various data files. It is also used to temporarily store data which overflows the RAM 123. Furthermore, the HDD 127 has various information storage areas: a scan type storage area 151, folder name storage area 152, file name storage area 153, scan data storage area 154, and scan date/time storage area 155. Details of these information storage areas will be described later with reference to the process flow of the host unit 120.

The communication I/F 125 controls communications with external devices such as the scanner unit 110. As in the case of the communication I/F 113, the communication I/F 125 may be a USB or other interface used to connect peripheral devices or Ethernet (registered trademark) or other network interface.

<Operation Flow of Scanner Unit>

FIG. 2 is an operation flowchart of the scanner unit 110. The series of processes described below is performed when the CPU 115 executes the various programs stored in the ROM 114. The process described below is started if either the New Scan button 118 or Continuous Scan button 119 is pressed when the scanner unit 110 is in standby state after being started at power-on.

In Step S201, the CPU 115 determines whether the New Scan button 118 or Continuous Scan button 119 is pressed. If it is determined that either of them is pressed, the CPU 115 proceeds to Step S202. If it is determined that none of them are pressed, the CPU 115 returns to the standby state and repeats Step S201.

In Step S202, the CPU 115 transmits scan type information to the host unit 120 via the communication I/F 113. Incidentally, the scan type information is an identification number corresponding to the button pressed in Step S201. For example, if the New Scan button 118 is pressed, the scan type information is "0" and if the Continuous Scan button 119 is pressed, the scan type information is "1". Incidentally, a command expressed by a character string such as "New Scan" or "Continuous Scan" may be used instead of the scan type information represented by a binary value. That is, it is sufficient if the host described later can recognize which of the New Scan button 118 and Continuous Scan button 119 is pressed.

In Step S203, the CPU 115 waits for a Scan Start command to be transmitted from the host unit 120 via the communication I/F 113. If a Scan Start command is confirmed, the CPU 115 proceeds to Step S204. If no Scan Start command is confirmed, the CPU 115 repeats Step S203 after waiting for a certain period of time. Incidentally, the CPU 115 may be configured to return to the standby state after error processing (not shown) when no Scan Start command is confirmed.

In Step S204, the CPU 115 performs scan control over the image scanning unit 116. Specifically, it makes the image scanning unit 116 scan an image from one page of an original. Then, the CPU 115 transmits digital data (image data) generated by the image scanning unit 116 to the host unit 120 via the communication I/F 113.

In Step S205, the CPU 115 checks whether the image scanning unit 116 has completed the scanning of the original successfully. If successful completion is not confirmed, the CPU 115 returns to Step S204 after waiting for a certain period of time. Incidentally, the CPU 115 may be configured to return to standby state after error processing (not shown) if successful completion is not confirmed.

In Step S206, the CPU 115 transmits information about the completion of scanning to the host unit 120 via the communication I/F 113. Then, it returns to standby state and repeats Step S201.

<Operation Flow of Host Unit>

Figure 3B:
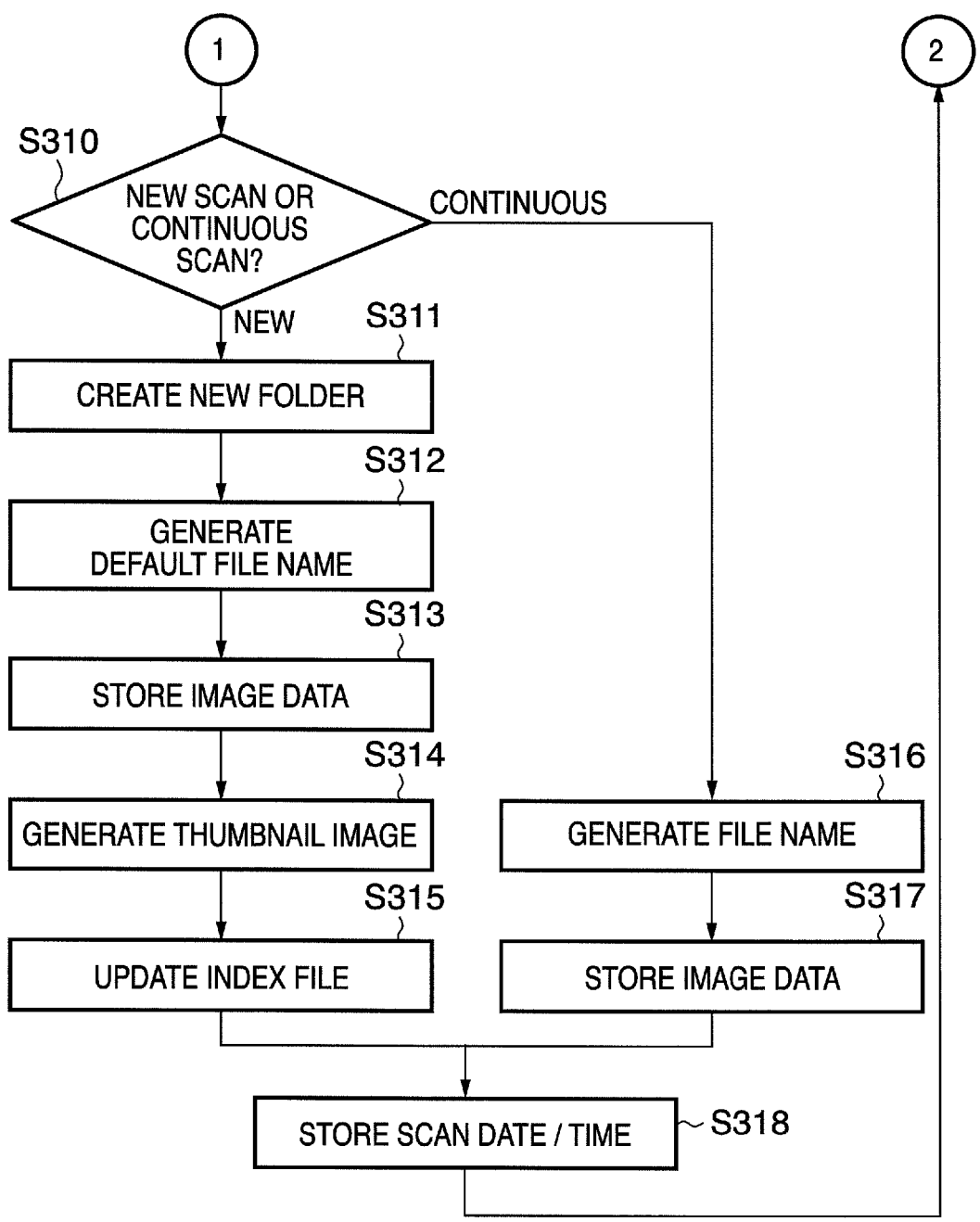
FIG. 3B is an operation flowchart of a host unit 120.

FIGS. 3A and 3B are operation flowcharts of the host unit 120. The series of processes described below is performed when the CPU 121 executes the various programs stored in the ROM 122 or HDD 127. The process described below is started upon receiving scan type information from the scanner unit 110 when the host unit 120 is in the standby state after being started at power-on.

In Step S301, the CPU 121 determines whether scan type information has been received by the communication I/F 125. That is, it determines whether the scan type information transmitted from the scanner unit 110 in Step S202 has been received. If it is determined that the scan type information has been received, the CPU 121 stores the received scan type information in the scan type storage area 151 and proceeds to Step S302. That is, either "0" or "1" is stored in the scan type storage area 151. If it is determined that the scan type information has not been received, the CPU 121 returns to the standby state and repeats Step S301. Incidentally, the CPU 121 may be configured to poll the scanner unit 110 for scan type information. Alternatively, the CPU 121 may be configured to check for reception of a "New Scan" or "Continuous Scan" command as described in Step S202.

In Step S302, the CPU 121 determines the content of the scan type information saved in the scan type storage area 151. If the scan type is "0" (New Scan), the CPU 121 proceeds to Step S307. If the scan type is "1" (Continuous Scan), the CPU 121 proceeds to Step S303.

In Step S303, the CPU 121 acquires time information about the previous scan by referring to the scan date/time storage area 155.

In Step S304, the CPU 121 acquires the present time from the timer 128 and compares it with the time information acquired in Step S303. The CPU 121 determines based on the results of comparison whether a predetermined time (e.g., 24 hours) has elapsed since the previous scan date/time. If not, the CPU 121 proceeds to Step S307. If the predetermined time has elapsed, the CPU 121 proceeds to Step S305. Incidentally, the predetermined time is preset by the user from the keyboard 124a and the like.

In Step S305, the CPU 121 displays a confirmation message asking the user whether he/she really wants to perform a continuous scan. This is because misoperation by the user is strongly suspected if the user specifies a continuous scan after a long lapse of time.

FIG. 4 is a diagram showing an example of a confirmation message displayed on a display unit 126. Incidentally, although the message is described here as being displayed on the display unit of the host unit 120, it may be configured to be displayed on the display unit 112 of the scanner unit 110. In that case, a press of the New Scan button 118 and Continuous Scan button 119 may be made to correspond to an OK button and Cancel button, respectively.

In Step S306, the CPU 121 accepts a decision entered by the user via the mouse 124b and the like in response to the message displayed in Step S305. If the user selects "OK," the CPU 121 proceeds to Step S307. If the user selects "Cancel" the CPU 121 returns to Step S301.

In Step S307, the CPU 121 transmits a Scan Start command to the scanner unit 110 via the communications cable 130.

In Step S308, the CPU 121 receives the image data transmitted from the scanner unit 110 in Step S204 and temporarily stores it in the scan data storage area 154. Incidentally, the image data may be stored temporarily in the RAM 123.

In Step S309, the CPU 121 determines whether the scan-complete signal transmitted from the scanner unit 110 in Step S206 has been received. If it is determined that the scan-complete signal has been received, the CPU 121 proceeds to Step S310. Otherwise, it returns to Step S308.

In Step S310, the CPU 121 refers to the scan type information stored in the scan type storage area 151. If the scan type is "0" (New Scan), the CPU 121 proceeds to Step S311. If the scan type is "1" (Continuous Scan), the CPU 121 proceeds to Step S316."

In Step S311, the CPU 121 decides a name of a new folder according to a folder-naming rule specified in advance and generates a folder of the decided name. According to this embodiment, for example, the following folder-naming rule is used.

Folder-Naming Rule:

If the scan type is "0" (New Scan), the CPU 121 derives a folder name, for example, "ScanFile_XXXX" and generates a folder of this name. XXXX is a numeric value which begins with 0000 and is incremented each time a folder is created. For example, folders named "ScanFile_0000, " "ScanFile_0001, " and "ScanFile_0002" are generated in sequence.

Thus, in Step S311, by referring to the folder name storage area 152, the CPU 121 derives a numeric value by incrementing the four digits in the previous folder name by one. For example, if a folder name "ScanFile_0003" is stored in the folder name storage area 152 as the last folder name generated, the CPU 121 will subsequently derive a folder name "ScanFile_0004" as the next folder name and generate a folder with the derived folder name. Incidentally, the location where the folder itself is generated may be either fixed or user-specifiable. After the folder is generated, its name is stored in the folder name storage area 152.

In Step S312, the CPU 121 decides a name of a new file according to a file-naming rule specified in advance and generates a file of the decided name. According to an embodiment, for example, the following file-naming rule is used.

File-Naming Rule:

When image data is generated in a folder, the CPU 121 derives a file name, for example, "Page_XXXX" and generates a file of this name. XXXX is a numeric value which begins with 0001 and is incremented each time a file is created. For example, files named "Page_0001" and "Page_0002" are generated in sequence. That is, the numeric value is incremented by 1 at the time of each continuous scan and returns to 0001 at the time of a new scan.

Thus, in Step S312, the CPU 121 always generates a file name "Page_0001." It stores the generated file name in the file name storage area 153. Incidentally, at this time, no image data is stored in "Page_0001."

Thus, in Step S313, the CPU 121 stores the image data by referring to the folder name storage area 152, file name storage area 153, and scan data storage area 154. That is, the image data in the scan data storage area 154 is stored in the file of the file name stored in the file name storage area 153, where the file is located in the folder of the folder name stored in the folder name storage area 152. Incidentally, the image data may be subjected to JPEG compression or various other manipulations before storage.

In Step S314, by referring to the scan data storage area 154, the CPU 121 generates a thumbnail image (reduced size image) corresponding to the stored image data and stores it in a designated folder for thumbnail images. This folder is located in the folder in which an index file (described later) is generated.

In Step S315, the CPU 121 generates or updates an index file. The index file describes correspondence between thumbnail images (generated in Step S314 and stored in the designated folder) corresponding to image data resulting from specified new scans and the name of the folder containing actual image data. According to this embodiment, the index file is generated in HTML format so that it can be displayed on an HTML browser. By displaying the index file on an HTML browser, the user can view a thumbnail image from the image data contained in the first file, i.e., "Page_0001," in each folder. This is because the first page is highly likely to contain a cover image which allows the original to be recognized more easily. The use of common HTML format for the index file allows the user to view the index file with only a browser which can display HTML without using special OS functions or specific applications.

That is, in Step S315, the CPU 121 updates the index file based on the thumbnail images generated in Step S314 and the folder name stored in the folder name storage area 152. Incidentally, if there is no index file, the CPU 121 generates a new index file.

In Step S318, the CPU 121 stores the present date/time in the scan date/time storage area 155 and returns to Step S301. That is, it enters standby state.

In Step S316, the CPU 121 decides and generates a file name based on the file-naming rule described earlier. More specifically, the CPU 121 increments the four digits of the last file name by one by referring to the file name storage area 153. For example, if "Page_0001" is stored in the file name storage area 153, the CPU 121 decides and generates a file name "Page_0002." The CPU 121 stores the generated file name in the file name storage area 153.

In Step S317, the CPU 121 stores the image data by referring to the folder name storage area 152, file name storage area 153, and scan data storage area 154. That is, the image data in the scan data storage area 154 is stored in the file of the file name stored in the file name storage area 153, where the file is located in the folder of the folder name stored in the folder name storage area 152. Incidentally, the image data may be subjected to JPEG compression or various other manipulations before storage.

Through the operation flows of the scanner unit 110 and host unit 120, image data corresponding to the original is stored in a folder on the HDD 127 in sequence. Thus, if the New Scan button 118 is pressed in Step S201, image data is stored in a new folder. On the other hand, if the Continuous Scan button 119 is pressed in Step S201, image data is stored in the same folder as the image data produced by the previous scan. That is, image data can be stored in separate folders in a way that corresponds to page groups.

<Concrete Example of Storing Image Data>

Figure 5:
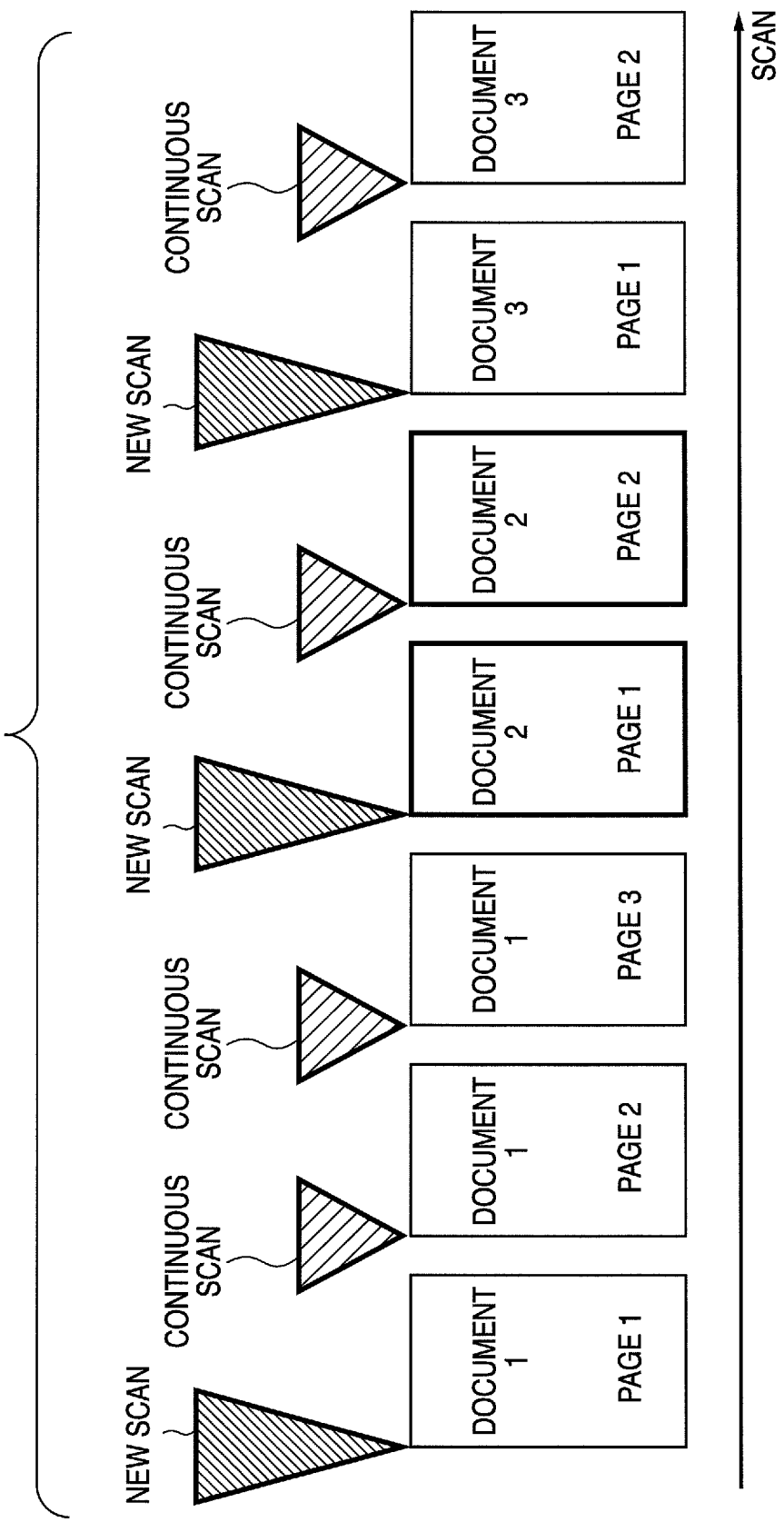
FIG. 5 is a diagram illustrating, in time sequence, an original and pressed buttons.

FIG. 5 is a diagram illustrating, in time sequence, an original and the buttons pressed in Step S201 in the image processing system. An original consisting of three documents for a total of seven pages is scanned here: document 1 consisting of three pages, document 2 consisting of two pages, and document 3 consisting of two pages. That is, the New Scan button 118 is pressed to scan the first page of each document and the Continuous Scan button 119 is pressed to scan the other pages.

Figure 6A:
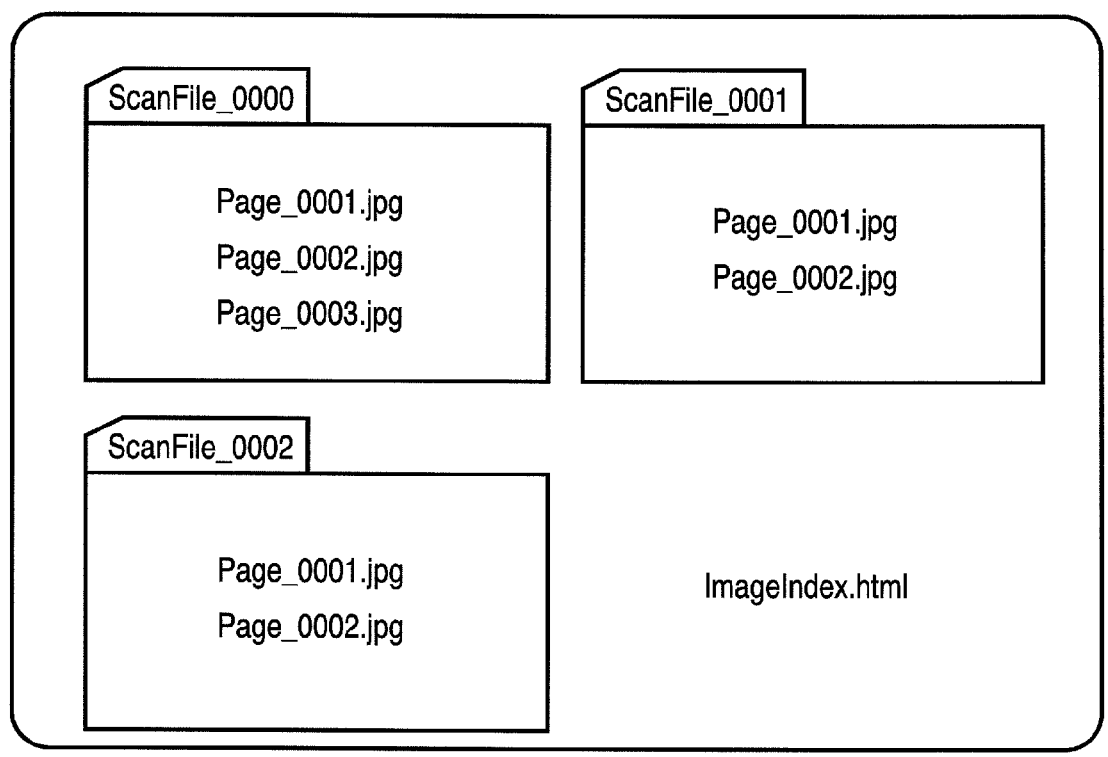
FIG. 6A is a diagram showing, in an exemplary fashion, a state of image data stored when the series of scanning operations in FIG. 5 is performed.

FIGS. 6A and 6B are diagrams showing, in an exemplary fashion, a state of image data stored on the HDD when the series of scanning operations in FIG. 5 is performed, where FIG. 6A shows a hierarchical structure of folders and files while FIG. 6B shows an example of a screen displayed on an HTML browser.

Specifically, three folders are generated on the HDD 127: "ScanFile_0000," "ScanFile_0001," and "ScanFile_0002." Three files are stored in the folder "ScanFile_0000": "Page_0001.jpg," "Page_0002.jpg," and "Page_0003.jpg." Two files are stored in the folder "ScanFile_0001": "Page_0001.jpg" and "Page_0002.jpg." Two files are stored in the folder "ScanFile_0002": "Page_0001.jpg" and "Page_0002.jpg." Also, an HTML file (ImageIndex.html) serving as an index file is stored.

When the HTML file (ImageIndex.html) is opened on an HTML browser, folders sorted so as to correspond to individual documents are displayed as shown in FIG. 6B. Furthermore, thumbnail images of the image data (Page_0001.jpg) on the first pages are displayed at the same time, making it easy for the user to tell what folder contains image data of what document.

As described above, this embodiment provides a technique which makes it possible to store image data scanned by an image scanning (scanner) unit in a storage unit in a simpler manner that corresponds to each group specified by the user. Besides, the user can complete a series of scanning operations by operating only the scanner unit 110.

Incidentally, according to the first embodiment, the New Scan button 118 and Continuous Scan button 119 are used to specify a new scan or continuous scan. However, a single Scan button and a New Scan/Continuous Scan selector switch may be used alternatively. Also, a duration of a button press may be used to distinguish between a new scan and continuous scan. Specifically, the button can be configured to specify a new scan when pressed longer than a predetermined time (e.g., 1 second), and a continuous scan when pressed shorter than a predetermined time.

Also, although according to the first embodiment, the system includes the scanner unit 110 and host unit 120 which are separate units, the system may be implemented as an MFP (multi-function printer) in which the scanner unit and host unit are integrated into a single unit.

(Second Embodiment)

A second embodiment of the image processing system according to the present invention will be described below taking as an example an image processing system including a scanner unit and host unit.

<Equipment Configuration>

Figure 7:
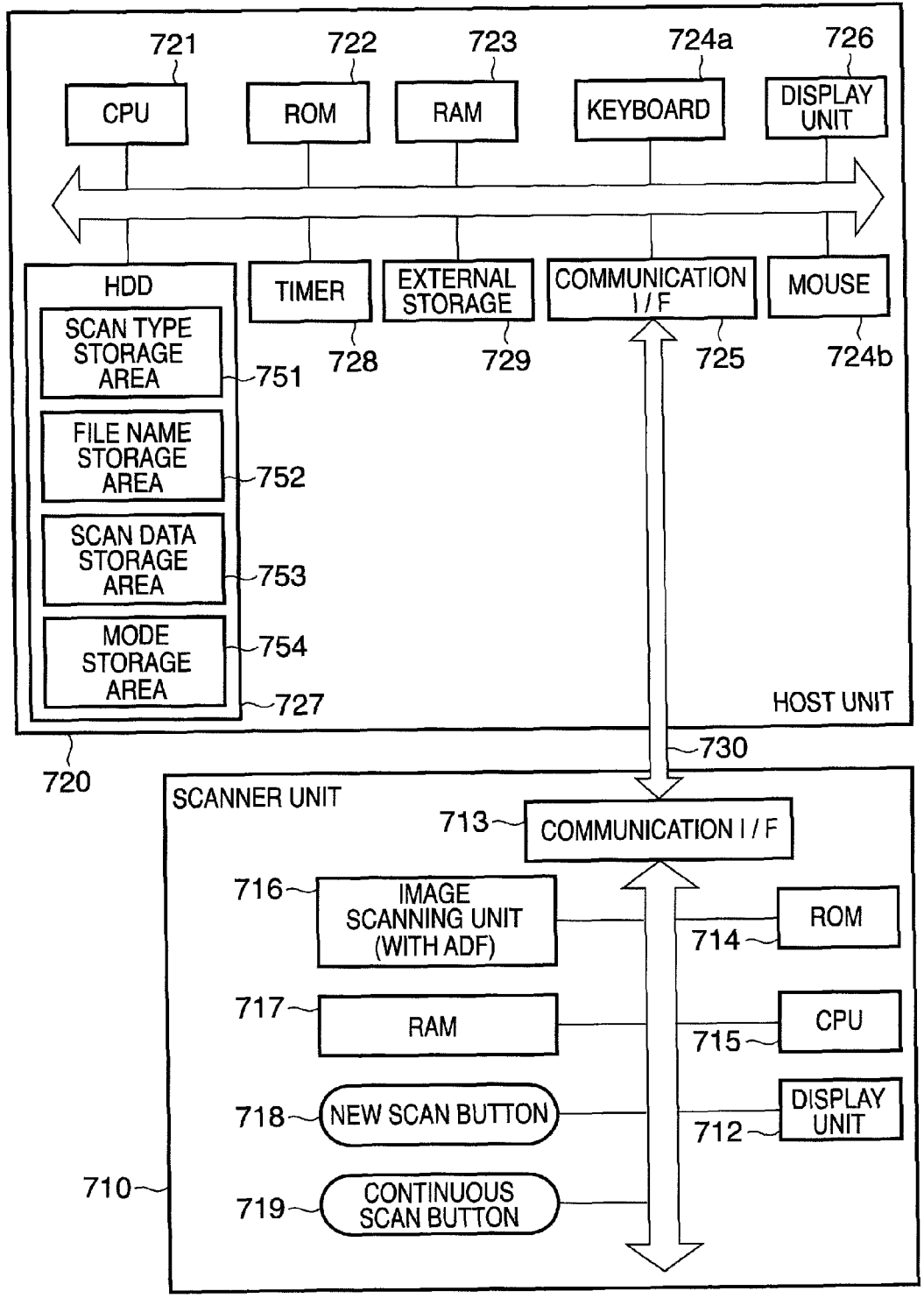
FIG. 7 is a block diagram showing an overall configuration of an image processing system according to a second embodiment.

FIG. 7 is a block diagram showing an overall configuration of the image processing system according to the second embodiment. As shown in the figure, the image processing system includes a scanner unit 710 which scans an original and generates image data and a host unit 720 which stores the image data generated by the scanner unit 710, as in the case of the first embodiment. Incidentally, the scanner unit 710 and host unit 720 are connected via a communications cable 730 so that they can exchange various digital data. Only differences from the first embodiment (FIG. 1) will be described below.

An image scanning unit 716 which is a component of the scanner unit 710 is equipped with an automatic document feeder (ADF) which automatically feeds an original consisting of one or more stacked pages. The image scanning unit 716 has a Single Scan mode in which one page of an original is scanned with a press of the scan button and an ADF Scan mode in which multiple pages of an original mounted on the ADF are scanned with a press of the scan button.

The ADF of the image scanning unit 716 is equipped with a document sensor (not shown), and a CPU 715 can constantly check any detection result produced by the document sensor. The image scanning unit 716 can return the detection result produced by the document sensor in response to polling by the host unit 720.

Thus, the second embodiment uses the detection results produced by the document sensor. Specifically, it switches between Single Scan mode and ADF Scan mode of the image scanning unit 716 based on the detection results. Details of the mode switching will be described later with reference to an operation flow.

Incidentally, the host unit 720 has almost the same configuration as the host unit 120, but differs in storage areas on an HDD.

<Operation Flow of Scanner Unit>

Figure 8:
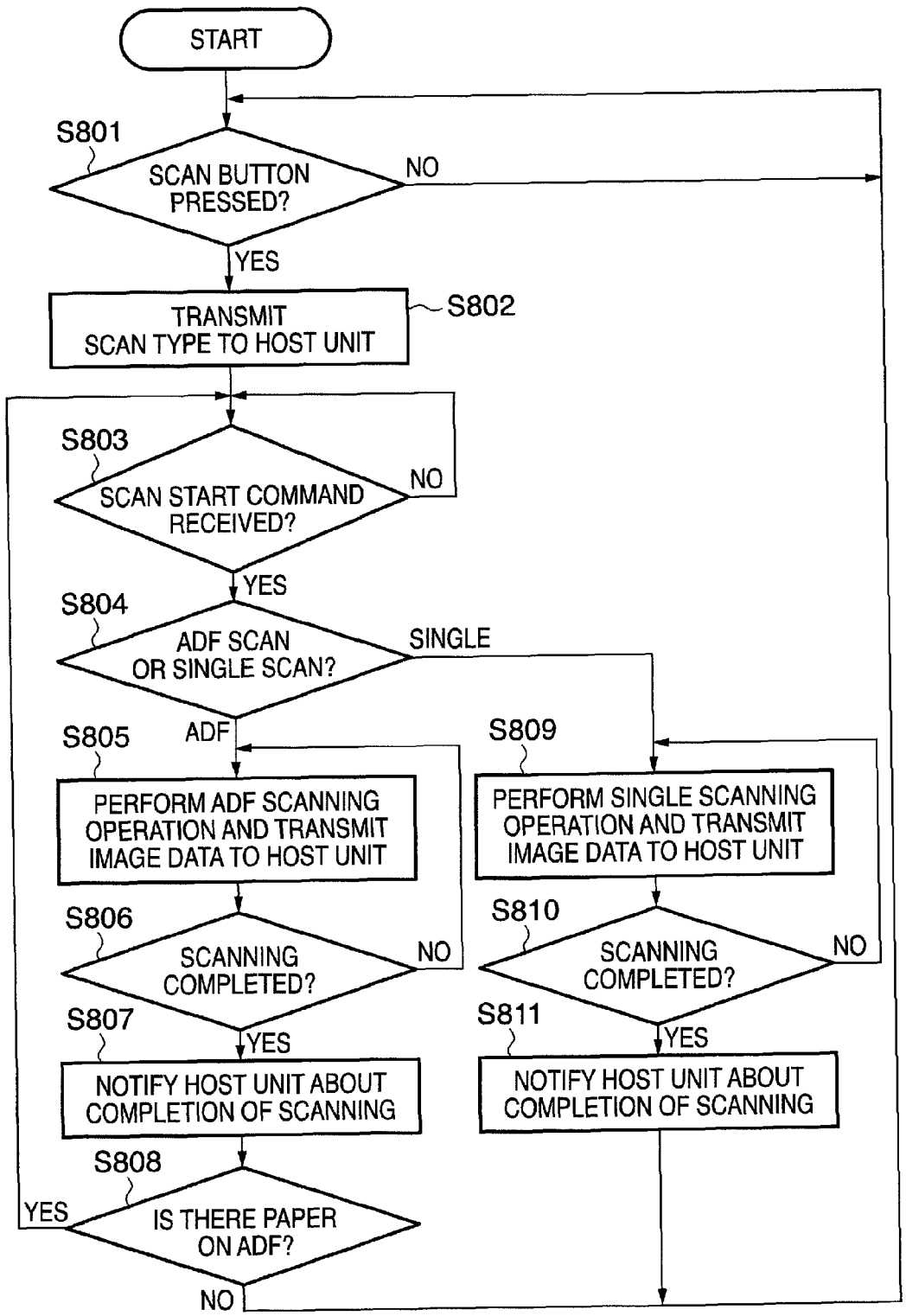
FIG. 8 is an operation flowchart of a scanner unit 710.

FIG. 8 is an operation flowchart of the scanner unit 710. The series of processes described below is performed when the CPU 715 executes the various programs stored in the ROM 714. The process described below is started if either a New Scan button 718 or Continuous Scan button 719 is pressed when the scanner unit 710 is in standby state after being started at power-on.

In Step S801, the CPU 715 determines whether the New Scan button 718 or Continuous Scan button 719 is pressed. If it is determined that either of them is pressed, the CPU 715 proceeds to Step S802. If it is determined that neither of them is pressed, the CPU 715 returns to a standby state and repeats Step S801.

In Step S802, the CPU 715 transmits scan type information to the host unit 720 via a communication I/F 713. Incidentally, the scan type information is an identification number corresponding to the button pressed in Step S801. For example, if the New Scan button 718 is pressed, the scan type information is "0" and if the Continuous Scan button 719 is pressed, the scan type information is "1."

In Step S803, the CPU 715 waits for a Scan Start command to be transmitted from the host unit 720 via the communication I/F 713. If a Scan Start command is confirmed, the CPU 715 proceeds to Step S804. If no Scan Start command is confirmed, the CPU 715 repeats Step S803 after waiting for a certain period of time. Incidentally, the CPU 715 may be configured to return to the standby state after error processing (not shown) when no Scan Start command is confirmed.

In Step S804, the CPU 715 determines whether an original is mounted on an ADF, by checking a document sensor on the ADF. If it is determined that an original is mounted on the ADF, the CPU 715 proceeds to Step S805 to perform an ADF scan. If it is determined that an original is not mounted on the ADF, the CPU 715 proceeds to Step S809 to perform a single scan.

In Step S805, the CPU 715 performs scan control over the image scanning unit 716 in ADF Scan mode. Specifically, it makes the image scanning unit 716 scan an image from one page of an original. Then, the CPU 715 transmits digital data (image data) generated by the image scanning unit 716 to the host unit 720 via the communication I/F 713.

In Step S806, the CPU 715 checks whether the image scanning unit 716 has completed the scanning of the original successfully. If successful completion is not confirmed, the CPU 715 returns to Step S805 after waiting for a certain period of time. Incidentally, the CPU 715 may be configured to return to the standby state after error processing (not shown) when successful completion is not confirmed.

In Step S807, the CPU 715 transmits information about the completion of scanning to the host unit 720 via the communication I/F 713.

In Step S808, the CPU 715 checks for any page of the original on the ADF using the document sensor. If there is any page on the ADF, the CPU 715 returns to Step S803. Subsequently, the CPU 715 repeats ADF scans until there is no page on the ADF. When there are no more pages on the ADF, the CPU 715 returns to the standby state and repeats Step S801.

In Step S809, the CPU 715 performs scan control over the image scanning unit 716 in Single Scan mode. Specifically, it makes the image scanning unit 716 scan an image from one page of an original. Then, the CPU 715 transmits digital data (image data) generated by the image scanning unit 716 to the host unit 720 via the communication I/F 713.

In Step S810, the CPU 715 checks whether the image scanning unit 716 has completed the scanning of the original successfully. If successful completion is not confirmed, the CPU 715 returns to Step S809 after waiting for a certain period of time. Incidentally, the CPU 715 may be configured to return to the standby state after error processing (not shown) when successful completion is not confirmed.

In Step S811, the CPU 715 transmits information about the completion of scanning to the host unit 720 via the communication I/F 713. Then, the CPU 715 returns to the standby state and repeats Step S801.

<Operation Flow of Host Unit>

Figure 9A:
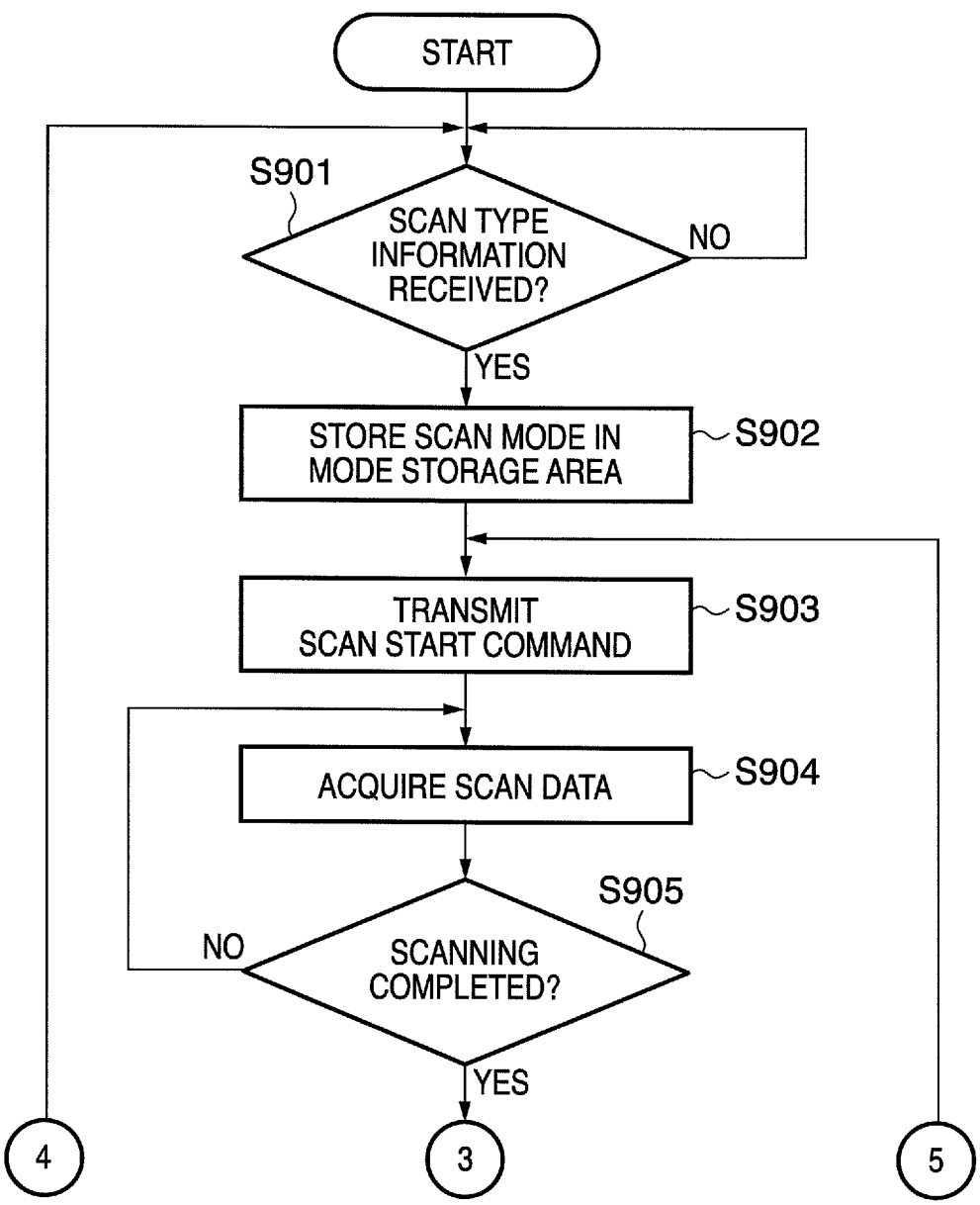
FIG. 9A is an operation flowchart of a host unit 720.
Figure 9B:
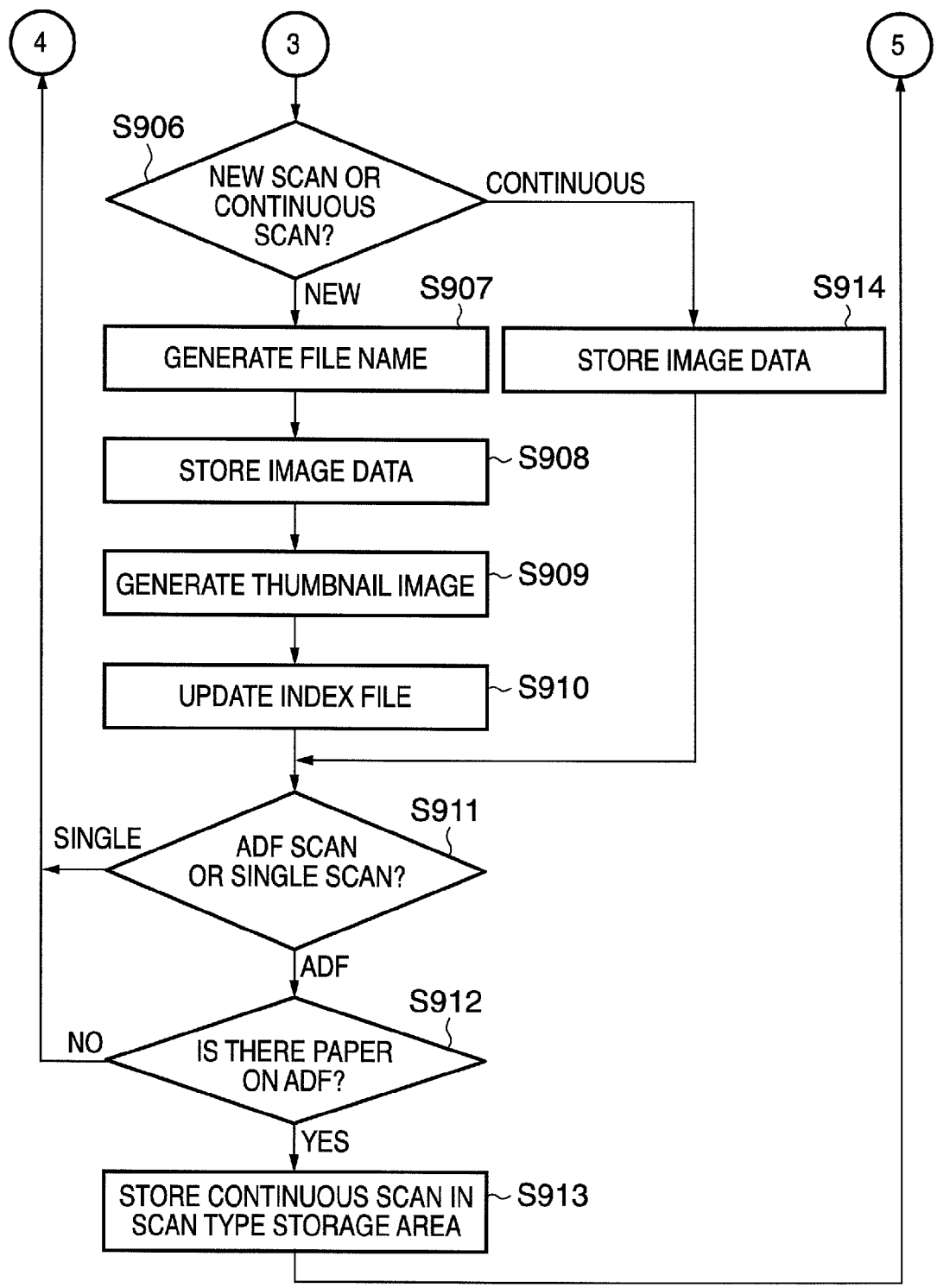
FIG. 9B is an operation flowchart of a host unit 720.

FIGS. 9A and 9B are operation flowcharts of the host unit 720. The series of processes described below is performed when the CPU 721 executes the various programs stored in the ROM 722 or HDD 727. The process described below is started upon receiving scan type information from the scanner unit 710 when the host unit 720 is in the standby state after being started at power-on.

In Step S901, the CPU 721 determines whether scan type information has been received by the communication I/F 725. That is, it determines whether the scan type information transmitted from the scanner unit 710 in Step S802 has been received. If it is determined that the scan type information has been received, the CPU 721 stores the received scan type information in the scan type storage area 751 and proceeds to Step S902. That is, either "0" or "1" is stored in the scan type storage area 751. If it is determined that the scan type information has not been received, the CPU 721 returns to the standby state and repeats Step S901. Incidentally, the CPU 721 may be configured to poll the scanner unit 710 for scan type information.

In Step S902, the CPU 721 inquires of the scanner unit 710 whether there is an original on the ADF of the scanner unit 710. If there is an original on the ADF, the CPU 721 stores an ID (e.g., "0") corresponding to the ADF Scan mode in a mode storage area 754. If there is no original on the ADF, the CPU 721 stores an ID (e.g., "1") corresponding to the Single Scan mode in the mode storage area 754.

In Step S903, the CPU 721 transmits a Scan Start command to the scanner unit 710 via the communications cable 730.

In Step S904, the CPU 721 receives the image data transmitted from the scanner unit 710 in Step S805 and temporarily stores it in a scan data storage area 753. Incidentally, the image data may be stored temporarily in the RAM 723.

In Step S905, the CPU 721 determines whether the scan-complete signal transmitted from the scanner unit 710 in Step S807 has been received. If the CPU 721 determines that the scan-complete signal has been received, it proceeds to Step S906. Otherwise, it returns to Step S904.

In Step S906, the CPU 721 refers to the scan type information stored in the scan type storage area 751. If the scan type is "0" (New Scan), the CPU 721 proceeds to Step S907. If the scan type is "1" (Continuous Scan), the CPU 721 proceeds to Step S914.

In Step S907, the CPU 721 decides a name of a new file according to a file-naming rule specified in advance and generates a file of the decided name. According to this embodiment, for example, the following file-naming rule is used.

File-Naming Rule:

When image data is generated in a folder, the CPU 721 derives a file name, for example, "DocumentFile_XXXX" and generates a file of this name. XXXX is a numeric value which begins with 0000 and is incremented each time a file is created. For example, files named "DocumentFile_0000" and "DocumentFile_0001" are generated in sequence. That is, the numeric value is incremented by 1 at the time of each continuous scan and returns to 0000 at the time of a new scan. The CPU 721 stores the generated file name in a file name storage area 752. Incidentally, at this time, no image data is stored in "DocumentFile_0000."

In Step S908, the CPU 721 stores the image data by referring to the file name storage area 752 and scan data storage area 753. That is, the image data in the scan data storage area 753 is stored in the file of the file name stored in the file name storage area 752. Incidentally, the image data may be subjected to JPEG compression or various other manipulations before storage.

In Step S909, by referring to the scan data storage area 753, the CPU 721 generates a thumbnail image corresponding to the stored image data and stores it in a designated folder for thumbnail images. This folder is located in the folder in which an index file (described later) is generated.

In Step S910, the CPU 721 generates or updates an index file. The index file describes correspondence between thumbnail images (generated in Step S909 and stored in the designated folder) from image data produced by specified new scans and the names of the files containing actual image data. According to this embodiment, the index file is generated in HTML format so that it can be displayed on an HTML browser. By displaying the index file on an HTML browser, the user can list thumbnail images from the image data contained in the first pages of "DocumentFile_XXXX" files. This is because the first page is highly likely to contain a cover image which allows the original to be recognized more easily. The use of common HTML format for the index file allows the user to view the index file with only a browser which can display HTML without using special OS functions or specific applications.

That is, in Step S910, the CPU 721 updates the index file based on the thumbnail images generated in Step S909 and the file name stored in the file name storage area 752. Incidentally, if there is no index file, the CPU 721 generates a new index file.

In Step S911, if an ID of "1" which represents Single Scan mode is stored in the mode storage area 754, the CPU 721 returns to Step S901. On the other hand, if an ID of "0" which represents ADF Scan mode is stored, the CPU 721 proceeds to Step S912.

In Step S912, the CPU 721 checks for any page of the original on the ADF of the scanner unit 710. If there is any page on the ADF, the CPU 721 proceeds to Step S913. If there is no page, the CPU 721 determines that all the pages on the ADF have been scanned and returns to Step S901.

In Step S913, the CPU 721 stores an ID of "1" which represents a continuous scan in the scan type storage area 751, and then it returns to Step S903.

In Step S914, by referring to the file name storage area 752 and scan data storage area 753, the CPU 721 adds the image data in the scan data storage area 753 to the file of the file name stored in the file name storage area 752. Then, the CPU 721 proceeds to Step S911. Incidentally, since an existing file is updated by the addition of image data, PDF or TIFF which has a concept of pages is used as the format of this file.

Through the operation flows of the scanner unit 710 and host unit 720, image data corresponding to the original is stored in a file on the HDD 727 in sequence. Thus, if the New Scan button 718 is pressed in Step S801, image data is stored in a new file. On the other hand, if the Continuous Scan button 719 is pressed in Step S801, image data is stored in the same file as the image data produced by the previous scan. That is, image data can be stored in separate files in a way that corresponds to page groups.

<Concrete Example of Storing Image Data>

Next, description will be given of how image data is stored when the image processing system according to the second embodiment is operated in the same time sequence as in FIG. 5. Specifically, an original consisting of three documents for a total of seven pages is scanned: document 1 consisting of three pages, document 2 consisting of two pages, and document 3 consisting of two pages. Besides, the New Scan button 718 is pressed to scan the first page of each document and the Continuous Scan button 719 is pressed to scan the other pages.

Figure 10B:
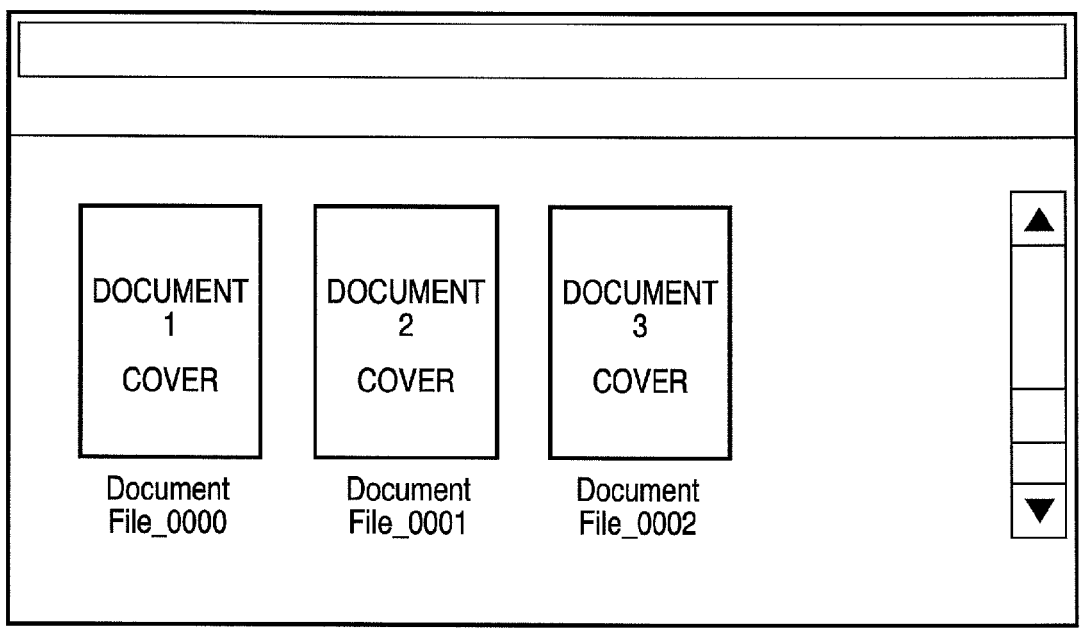
FIG. 10B is a diagram showing, in an exemplary fashion, a state of image data stored when the series of scanning operations in FIG. 5 is performed.

FIGS. 10A and 10B are diagrams showing, in an exemplary fashion, a state of image data stored on the HDD when the series of scanning operations in FIG. 5 is performed, where FIG. 10A shows files corresponding to documents while FIG. 10B shows an example of a screen displayed on an HTML browser.

Specifically, three files are generated on the HDD 727: "DocumentFile_0000.pdf," "DocumentFile_0001.pdf," and "DocumentFile_0002.pdf." Three items of image data are stored in the file "DocumentFile_0000.pdf." Two items of image data are stored in the file "DocumentFile_0001.pdf." Two items of image data are stored in the file "DocumentFile_0002.pdf." Also, an HTML file (ImageIndex.html) serving as an index file is stored.

When the HTML file (ImageIndex.html) is opened on an HTML browser, file names corresponding to individual documents are displayed as shown in FIG. 10B. Furthermore, a thumbnail image of the image data on the first page of each file is displayed at the same time, making it easy for the user to identify the file which contains image data of what document.

As described above, this embodiment provides a technique which makes it possible to store image data scanned by an image scanning (scanner) unit in a storage unit in a way that corresponds to each page group while reducing burden on the user. Besides this, the user can complete a series of scanning operations by operating only the scanner unit 710.

(Variations)

The system may be configured to allow the user to select a file format used for storage: JPEG format without a concept of pages (such as described in the first embodiment) or PDF with a concept of pages (such as described in the second embodiment). For example, a button for use to select a format to save the file in may be provided in the scanner unit.

Figure 11:
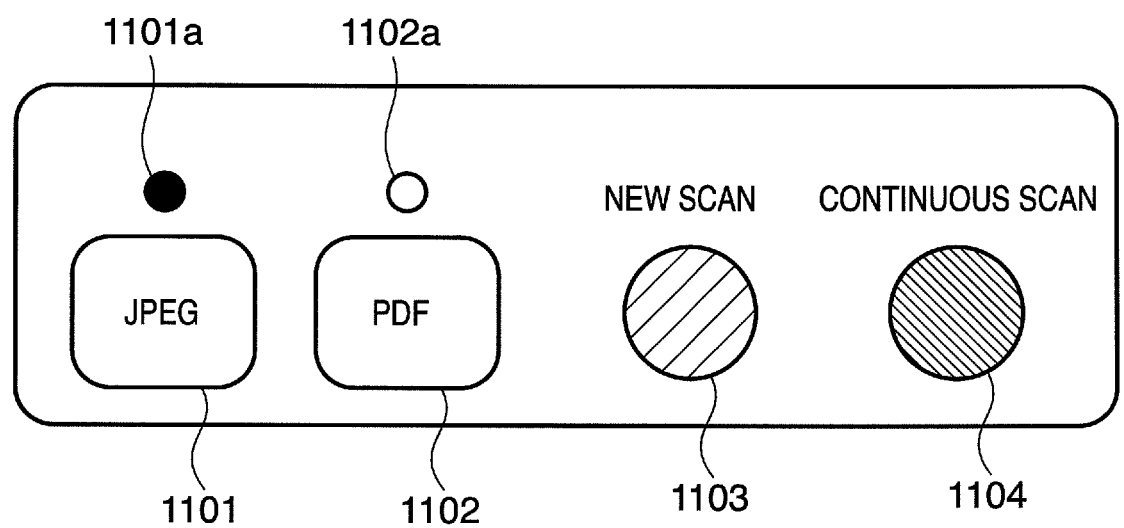
FIG. 11 is a diagram showing an example of file format selection buttons installed in a scanner unit.

FIG. 11 is a diagram showing an example of file format selection buttons installed in a scanner unit. Reference numerals 1101 and 1102 denote buttons used to specify storage in JPEG format and PDF format, respectively. The buttons 1101 and 1102 have a mutually exclusive relationship: when one of them is selected by the user, the other is deselected. Thus, one of LEDs 1101a and 1102a installed around the buttons illuminated to indicate which of the buttons is activated. Reference numeral 1103 denotes a New Scan button and 1104 denotes a Continuous Scan button. When the user selects a saving format in this way, either a separate index file may be provided for each saving format or a single index file may be provided for all saving formats.

(Variation 2)

According to the first embodiment, in the case of a new scan, a new folder is created and image data is saved in it. A new folder may be created only for a continuous scan directly following a new scan and the image data from the continuous scan may be stored in the newly created folder together with the image data from the new scan. When continuous scans are repeated, the same procedures as in the first embodiment are followed. In this case, each set of related image files is saved together in a newly created folder and any image file that does not have a related image file is saved without creating a new folder.

(Other Embodiments)

Embodiments of the present invention have been described in detail above, but the present invention may be applied either to a system consisting of two or more devices or to an apparatus consisting of a single device.

Incidentally, the present invention can also be achieved by a configuration in which a program that implements the functions of the embodiments described above is supplied to a system or apparatus either directly or remotely and a computer in the system or apparatus reads out and executes the supplied program. Thus, program code itself installed on the computer to implement functions and processes of the present invention on the computer is also included in the scope the present invention.

In that case, the program code may take any form including object code, programs executed by an interpreter, and script data supplied to an OS as long as it has program functions.

Recording media available for use to supply the program include, for example, floppy (registered trademark) disks, hard disks, optical disks (CD and DVD), magneto-optical disks, magnetic tape, non-volatile memory cards, and ROM.

The program can also be supplied via an Internet homepage. In that case, the user is supposed to connect to an Internet homepage using a browser on a client computer and download the computer program itself of the present invention or a compressed self-installing file onto a recording medium such as a hard disk. Also, the program code of the program according to the present invention may be divided into multiple files, which can be downloaded from respective homepages. That is, the present invention as defined in the claims also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiments may be implemented not only by the program read out and executed by the computer, but also, for example, by part or all of the actual processing executed, in accordance with instructions from the program, by an OS running on the computer.

Furthermore, the functions of the above embodiments may also be implemented by part or all of the actual processing executed by a CPU or the like contained in a function expansion board inserted into the computer or a function expansion unit connected to the computer if the processing is performed in accordance with instructions from the program that has been read out of the recording medium and written into memory on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-115014, filed Apr. 18, 2006, which is hereby incorporated by reference herein in its entirety.

What is claimed is:

1. A system comprising:
a first command input unit which inputs, in a case where a first original has been read by a reading device and first image data of the first original has been stored in a memory, a first command for a first method in which both of reading of a second original and storing second image data of the second original separately from the first read image in the memory are executed, based on an operation by an operator;
a second command input unit which inputs, in a case where the first original has been read by the reading device and the first image data has been stored in the memory, a second command for a second method in which both of reading of the second original and storing the second image data by associating the first image data in the memory, based on an operation by the operator;
a selecting unit configured to select the first method if the first command is input by the first command input unit, and to select the second method if the second command is input by the second command input unit; and
a control unit configured to cause the reading device to read the second original, and to store the second image data in the memory separately from the first image data, in a case where the first method is selected by the selecting unit, and to cause the reading device to read the second original, and to store the second image data in the memory by associating the second image data, in a case where the second method is selected by the selecting unit.

2. The system according to claim 1, wherein the control unit performs control so as to:
store the second image data in a folder different from a folder for containing the first image data in a case where the first command is input by the first command input unit; and
store the second image data in the folder for containing the first image data in a case where the second command is input by the second command input unit.

3. The system according to claim 2, further comprising a management data generating unit which generates management data including index information about the folder generated in the memory.

4. The system according to claim 2, wherein the control unit performs control so as to generate a new folder different from an existing folder containing the first image data and to store the second image data in the generated folder, in a case where the first command is input by the first command input unit.

5. The system according to claim 3, further comprising:
a reduced size image generating unit which generates reduced size image data corresponding to the second image data and stores the reduced size image data in the memory in a case where the first command is input by the first command input unit, wherein
the management data includes association information which associates the index information about the folder with reduced size image data corresponding to at least one item of image data stored in the folder.

6. The system according to claim 1, further comprising a file constructing unit which can generate or update a file in a format capable of storing one or more items of image data, wherein
the control unit controls the file constructing unit so as to:
store an item of the second image data in the memory by generating a new file for use to save the second image data in a case where the first command is input by the first command input unit, and
store the item of the second image data in the memory by adding the second image data to an existing file containing the first image data which is read in a preceding reading and is stored in the memory, in a case where the second command is input by the second command input unit.

7. The system according to claim 6, further comprising a management data generating unit which generates management data including index information about the file generated in the memory.

8. The system according to claim 7, further comprising:
a reduced size image generating unit which generates reduced size image data corresponding to the second image data and stores the reduced size image data in the storage unit in a case where the first command is input by the first command input unit, wherein
the management data includes association information which associates the index information about the file with reduced size image data corresponding to at least one item of image data stored in the file.

9. The system according to claim 1, further comprising an automatic sheet feeder which supplies an original to the image scanning unit, wherein
the control unit performs control so as to store the second image data in the storage unit by associating the first image data which is generated in an immediately preceding reading and is stored in the memory, even when the first command is input by the first command input unit in a case where any original is remaining in the automatic sheet feeder.

10. The system according to claim 9, the first command input unit or the second command input unit inputs the first command or the second command, in a case where any original is not remaining in the automatic sheet feeder after one or more original set in the automatic sheet feeder have been read by the reading device.

11. The system according to claim 1, further comprising:
a timer unit which manages time; and
a notifying unit which notifies an operator about equipment state, wherein
the notifying unit notifies the operator when the second command is input by the second command input unit, in a case where a predetermined time interval has elapsed since the first command or the second command is input by the first command input unit or the second command input unit in an immediately preceding reading.

12. The system according to claim 1, wherein the apparatus and the reading device are included in different cases.

13. The system according to claim 12, wherein the first command input unit and the second command input unit input the first command and the second command respectively based on an operation by an operator via an operating unit of the reading device.

14. The system according to claim 13, wherein the operating unit of the reading device comprises a first button for the first command and a second button for the second command.

15. The system according to claim 1, wherein, for each reading by the reading device, the first command by the first command input unit or the second command by the second command input unit is input, and the selection unit selects the first command or the second command.

16. The system according to claim 1, the first command input unit inputs the first command, in accordance with a single operation by the operator.

17. The system according to claim 1, wherein the control unit stores the second image data in a file different from a file for containing the first image data, in a case where the first command is input, and to store the item of the second image data in the file for containing the first image data in a case where the second command is input.

18. The system according to claim 17, wherein the control unit stores the second image data in a new file different from an existing file containing the first image data, in a case where the first command is input, and to store the second image data in the existing file in a case where the second command is input.

19. The system according to claim 17, wherein the control unit stores the item of the second image data in a file of which a file format is PDF or TIFF.

20. An apparatus comprising:
a first command input unit which inputs, in a case where a first original has been read by a reading device and first image data of the first original has been stored in a memory, a first command for a first method in which both of reading of a second original and storing second image data of the second original separately from the first read image in the memory are executed, based on an operation by a user;
a second command input unit which inputs, in a case where the first original has been read by the reading device and the first image data has been stored in the memory, a second command for a second method in which both of reading of the second original and storing the second image data by associating the first image data in the memory, based on an operation by a user;
a selecting unit configured to select the first method, in a case where the first command input unit inputs the first command, and to select the second method, in a case where the second command input unit inputs the second command; and
a control unit which performs control configured to cause the reading device to read the second original, and to store the second image data in the memory separately from the first image data, in a case where the first method is selected by the selecting unit, and to cause the reading device to read the second original, and to store the second image data in the memory by associating the second image data, in a case where the second method is selected by the selecting unit.

21. The apparatus according to claim 20, wherein the apparatus and the reading device are included in different cases.

22. A method comprising:
inputting, in a case where a first original has been read by a reading device and first image data of the first original has been stored in a memory, a first command for a first method in which both of reading of a second original and storing second image data of the second original separately from the first read image in the memory are executed, based on an operation by an operator;
inputting, in a case where the first original has been read by the reading device and the first image data has been stored in the memory, a second command for a second method in which both of reading of the second original and storing the second image data by associating the first image data in the memory, based on an operation by the operator;
selecting the first method if the first command is input, and to select the second method if the second command is input; and
performing control to cause the reading device to read the second original, and to store the second image data in the memory separately from the first image data, in a case where the first method is selected, and to cause the reading device to read the second original, and to store the second image data in the memory by associating the second image data, in a case where the second method is selected.

23. A non-transitory computer-readable medium, including a program which, when executed by a computer, causes the computer to perform operations comprising:

inputting, in a case where a first original has been read by a reading device and first image data of the first original has been stored in a memory, a first command for a first method in which both of reading of a second original and storing second image data of the second original separately from the first read image in the memory are executed, based on an operation by an operator;

inputting, in a case where the first original has been read by the reading device and the first image data has been stored in the memory, a second command for a second method in which both of reading of the second original and storing the second image data by associating the first image data in the memory, based on an operation by the operator;

selecting the first method if the first command is input, and to select the second method if the second command is input; and performing control to cause the reading device to read the second original, and to store the second image data in the memory separately from the first image data, in a case where the first method is selected, and to cause the reading device to read the second original, and to store the second image data in the memory by associating the second image data, in a case where the second method is selected.

* * * * *